(12) United States Patent
Couture et al.

(10) Patent No.: US 11,685,447 B2
(45) Date of Patent: Jun. 27, 2023

(54) GUARD ASSEMBLY AND VEHICLE HAVING SAME

(71) Applicant: BOMBARDIER RECREATIONAL PRODUCTS INC., Valcourt (CA)

(72) Inventors: Raphael Couture, Sherbrooke (CA); Steve Do Rego, Granby (CA); Daniel Girard, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 571 days.

(21) Appl. No.: 16/743,036

(22) Filed: Jan. 15, 2020

(65) Prior Publication Data

US 2020/0339200 A1    Oct. 29, 2020

Related U.S. Application Data

(60) Provisional application No. 62/839,296, filed on Apr. 26, 2019.

(51) Int. Cl.
| | |
|---|---|
| *B62D 25/18* | (2006.01) |
| *B62D 25/16* | (2006.01) |
| *B62D 55/112* | (2006.01) |
| *B62D 55/10* | (2006.01) |
| *B62M 27/02* | (2006.01) |
| *B62D 55/065* | (2006.01) |

(52) U.S. Cl.
CPC ........... *B62D 25/18* (2013.01); *B62D 25/165* (2013.01); *B62D 55/065* (2013.01); *B62D 55/10* (2013.01); *B62D 55/112* (2013.01); *B62M 27/02* (2013.01); *B62M 2027/026* (2013.01); *B62M 2027/028* (2013.01)

(58) Field of Classification Search
CPC ........ B62M 2027/02; B62M 2027/026; B62M 2027/028; B62M 27/02; B62D 25/161; B62D 25/165; B62D 25/166; B62D 25/168; B62D 55/065; B62D 55/10; B62D 55/088; B62D 55/04; B62D 55/0847
USPC ....... 180/9.26, 9.46; 280/156, 157, 159, 854
See application file for complete search history.

(56) References Cited

U.S. PATENT DOCUMENTS

| | | | | |
|---|---|---|---|---|
| 2,211,654 | A * | 8/1940 | Heaslet | B62D 55/0845 280/847 |
| 3,412,821 | A * | 11/1968 | Humphrey | B62M 27/02 305/141 |
| 4,146,101 | A * | 3/1979 | Plourde | B62M 27/02 280/21.1 |
| 4,740,003 | A * | 4/1988 | Antekeier | B62D 25/168 280/848 |
| 5,241,780 | A * | 9/1993 | Zaun | B60R 19/54 47/1.7 |

(Continued)

FOREIGN PATENT DOCUMENTS

JP    3-38482    *    2/1991    ............ B62M 27/02

*Primary Examiner* — Anne Marie M Boehler
(74) *Attorney, Agent, or Firm* — BCF LLP

(57) ABSTRACT

A guard assembly is provided for use with a track assembly for a vehicle. The guard assembly includes a guard body having a rigid portion made of a first polymeric material and a flexible portion made of a second polymeric material different from the first polymeric material. The first polymeric material has a greater modulus of elasticity than the second polymeric material. A vehicle including a guard assembly, namely including a guard body is also contemplated.

18 Claims, 14 Drawing Sheets

(56) References Cited

U.S. PATENT DOCUMENTS

| | | | | |
|---|---|---|---|---|
| 5,269,547 | A * | 12/1993 | Antekeier | B62D 25/188 |
| | | | | 280/154 |
| 5,403,026 | A * | 4/1995 | Dahl | B62D 25/16 |
| | | | | 172/517 |
| 5,836,399 | A * | 11/1998 | Maiwald | B62D 25/186 |
| | | | | 280/157 |
| 6,267,458 | B1 * | 7/2001 | Hansen | B62D 55/0845 |
| | | | | 305/108 |
| 6,276,746 | B1 * | 8/2001 | Gentry | B62D 37/02 |
| | | | | 296/180.1 |
| 7,909,392 | B2 * | 3/2011 | Takeuchi | B62D 25/161 |
| | | | | 296/39.1 |
| 8,668,227 | B1 * | 3/2014 | Peotter | B62D 25/209 |
| | | | | 280/847 |
| 9,694,857 | B2 | 7/2017 | Rudwal et al. | |
| 11,186,322 | B2 * | 11/2021 | Smith | B62D 35/001 |
| 2007/0246268 | A1 * | 10/2007 | Snyder | B62D 55/07 |
| | | | | 180/9.44 |
| 2013/0154228 | A1 * | 6/2013 | Ducroquet | B62D 25/168 |
| | | | | 280/157 |
| 2015/0284032 | A1 * | 10/2015 | Hanson | B60Q 1/2619 |
| | | | | 296/198 |
| 2019/0126871 | A1 * | 5/2019 | McNeilus | B60R 19/03 |
| 2019/0248433 | A1 * | 8/2019 | Aubin-Marchand | B62D 55/10 |
| 2020/0262488 | A1 * | 8/2020 | Bering | B62D 25/188 |
| 2020/0277012 | A1 * | 9/2020 | Thompson | B60C 7/143 |
| 2021/0268954 | A1 * | 9/2021 | DeBoer | B62D 55/00 |

\* cited by examiner

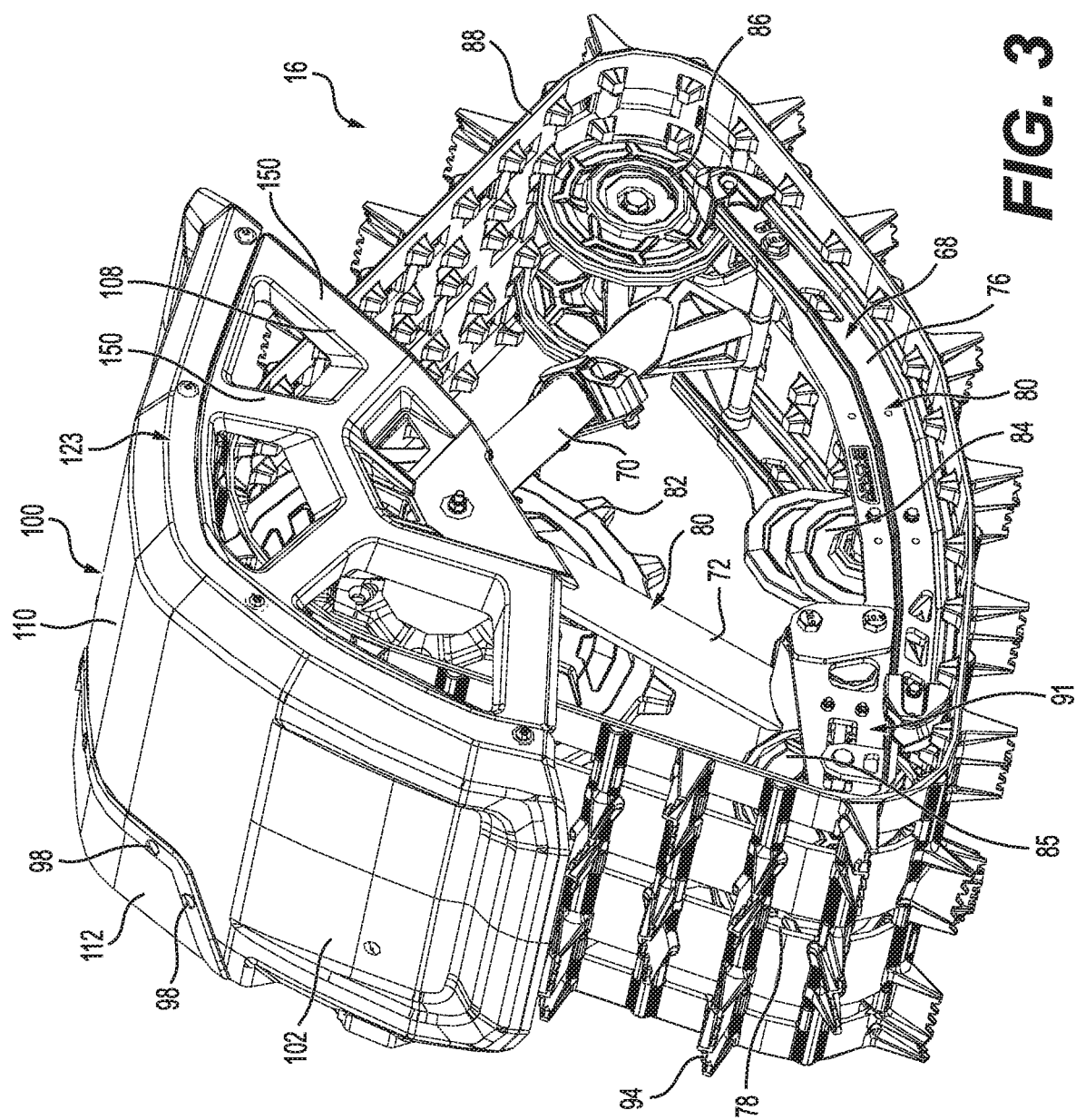

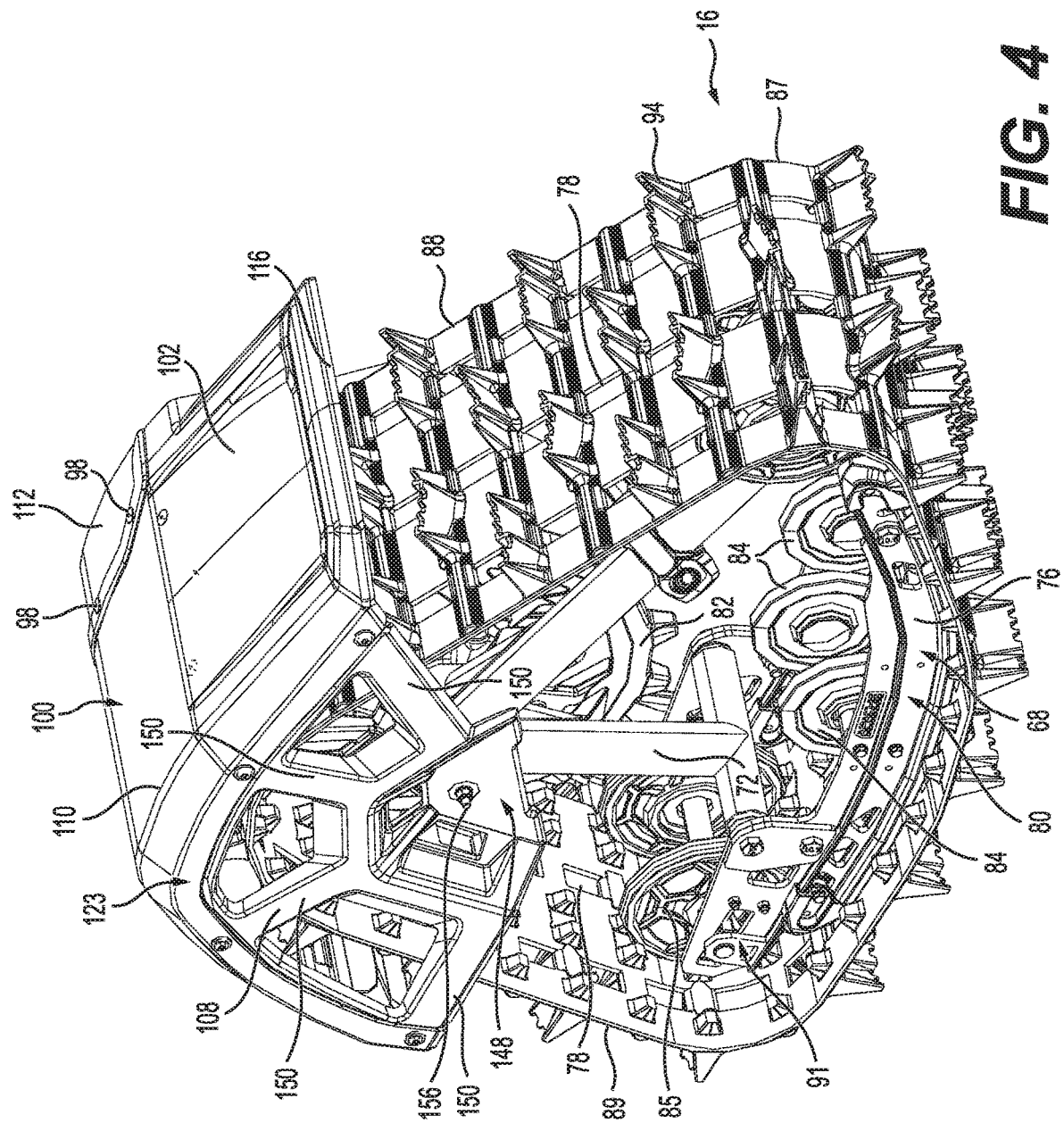

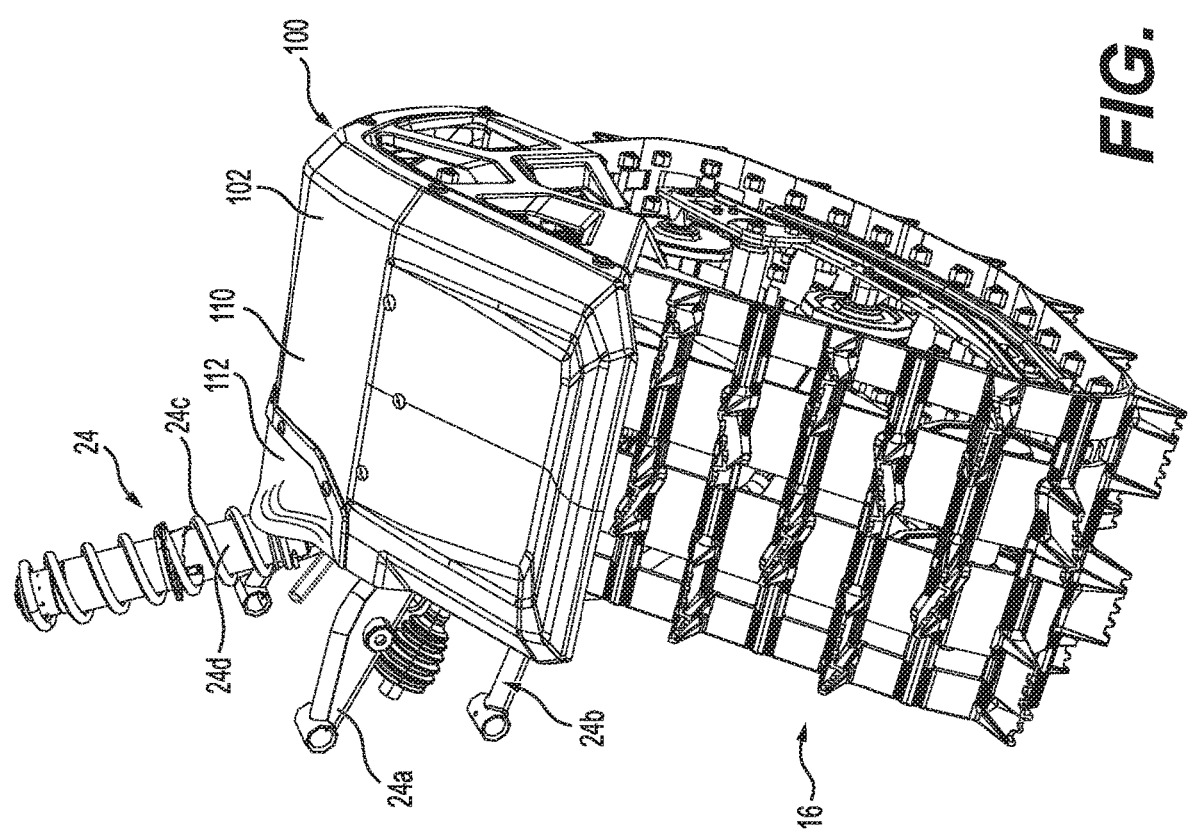

GUARD ASSEMBLY AND VEHICLE HAVING SAME

CROSS-REFERENCE

The present application claims priority to U.S. Provisional Patent Application No. 62/839,296, filed on Apr. 26, 2019, the entirety of which is incorporated herein by reference.

FIELD OF THE TECHNOLOGY

The present technology relates to a guard assembly for use with a vehicle track assembly and to a vehicle having same.

BACKGROUND

Off-road vehicles such as all-terrain vehicles (ATVs), side-by-side vehicles (SSV) and similar vehicles are used for utility and recreational purposes. Some of these vehicles are configured to be interchangeably equipped with ground-engaging wheels or track assemblies, such as to allow a user to equip the vehicle with either option in accordance with terrain conditions and/or desired handling performance Track assemblies are particularly useful for instance when travelling over deep snow as the increased contact area between the track assemblies' tracks and the ground allows for greater floatation.

When an off-road vehicle is equipped with track assemblies and travels over snow, snow begins accumulating on an inner side of the track assemblies' tracks. This results in the front track assemblies having a tendency to project snow and/or debris upwards near a drive wheel thereof thus undesirably covering parts of the vehicle and/or the occupant(s) thereof with the projected snow. To address this, in some cases, the vehicle is provided with fenders meant to accommodate both ground-engaging wheels and track assemblies such as to protect the vehicle and/or the occupants from projected snow and/or debris whether the vehicle is equipped with the ground-engaging wheels or the track assemblies. However, even though these fenders can be made extra wide to accommodate track assemblies, the fenders tend to be distanced from the corresponding tracks of the track assemblies. As such, when the vehicle is equipped with the track assemblies, snow often travels around the fenders and still ends up on the vehicle and/or the occupants thereof.

Thus, there is a desire for a vehicle having a guard assembly that addresses some of the aforementioned drawbacks.

SUMMARY

It is an object of the present technology to ameliorate at least some of the inconveniences present in the prior art.

According to an aspect of the present technology, there is provided a vehicle. The vehicle includes a vehicle frame; a motor supported by the vehicle frame; a track assembly operatively connected to the vehicle frame, and a guard assembly connected to the track assembly. The track assembly includes: a track assembly frame; an endless track having at least one row of drive features; and a plurality of track-engaging wheels. The plurality of track-engaging wheels includes a drive wheel rotatably connected to the track assembly frame at least one idler wheel rotatably connected to the track assembly frame. The drive wheel is configured to engage the drive features of the endless track to rotate the endless track about the plurality of track-engaging wheels and thereby propel the vehicle. The guard assembly includes: a guard body positioned vertically above the endless track, and at least one support member connecting the guard body to the track assembly frame. At least a portion of the guard body extends over the drive wheel.

In some embodiments, the guard body is made of polymeric material.

In some embodiments, the guard body is made of a first polymeric material and a second polymeric material different from the first polymeric material. The first polymeric material has a greater modulus of elasticity than the second polymeric material. The guard body has a rigid portion made of the first polymeric material and a flexible portion made of the second polymeric material.

In some embodiments, the guard body has an inner lateral edge and an outer lateral edge. The inner lateral edge is laterally closer to a longitudinal centerplane of the vehicle than the outer lateral edge. The flexible portion extends along at least a portion of the inner lateral edge of the guard body.

In some embodiments, the flexible portion extends along less than half of a width of the guard body.

In some embodiments, the flexible portion extends along less than half of a length of the guard body.

In some embodiments, the guard body has a front longitudinal edge and a rear longitudinal edge, and the flexible portion is distanced from the front and rear longitudinal edges of the guard body.

In some embodiments, the rigid portion makes up a majority of the guard body.

In some embodiments, the rigid portion makes up at least 80% of the guard body.

In some embodiments, the flexible portion is fastened to the rigid portion.

In some embodiments, the vehicle also includes a suspension assembly operatively connecting the track assembly to the vehicle frame. The suspension assembly includes a shock absorber. The flexible portion is longitudinally aligned with the shock absorber. During use, the flexible portion deforms to a deformed state when the flexible portion contacts the shock absorber and returns to an undeformed state when the flexible portion is no longer in contact with the shock absorber.

In some embodiments, the guard body spans at least a width of the endless track.

In some embodiments, the at least one support member of the guard assembly includes an inner support member disposed on a lateral inner side of the track assembly, and an outer support member disposed on a lateral outer side of the track assembly.

In some embodiments, the inner support member is a front inner support member. The at least one support member also includes a rear inner support member. The rear inner support member is disposed on the lateral inner side of the track assembly rearward of the front inner support member.

In some embodiments, the track assembly frame includes: a drive wheel support rotatably supporting the drive wheel; a front rail member extending forwardly from the drive wheel support; a rear rail member extending rearwardly from the drive wheel support; and a lower wheel support connected to the front and rear rail members. The at least one idler wheel is rotatably mounted to the lower wheel support. The front inner support member is connected between the guard body and the front rail member. The rear inner support member is connected between the guard body and the lower wheel support.

In some embodiments, each of the front and rear inner support members includes a rigid link having a first end and a second end. The first end of the rigid link is affixed to the guard body and the second end of the rigid link is affixed to the track assembly frame.

In some embodiments, the second end of the rigid link of the front inner support member is affixed to the front rail member of the track assembly frame, and the second end of the rigid link of the rear inner support member is affixed to the lower wheel support of the track assembly frame.

In some embodiments, the guard body includes: a rigid portion made of a first polymeric material and a flexible portion made of a second polymeric material different from the first polymeric material. The first polymeric material has a greater modulus of elasticity than the second polymeric material. The first end of the rigid link of the front inner support member is affixed to the rigid portion of the guard body forwardly of the flexible portion. The first end of the rigid link of the rear inner support member is affixed to the rigid portion of the guard body rearwardly of the flexible portion.

In some embodiments, the outer support member is made of polymeric material.

In some embodiments, the track assembly frame includes a drive wheel support rotatably supporting the drive wheel. The outer support member is connected between the guard body and the drive wheel support.

In some embodiments, the outer support member has an upper portion and a lower portion. The upper portion of the outer support member is connected to an outer lateral end portion of the guard body. The lower portion of the outer support member is connected to the drive wheel support of the track assembly frame.

In some embodiments, the drive wheel is rotatable about a drive wheel axis, and the drive wheel axis extends through the lower portion of the outer support member.

In some embodiments, the outer support member comprises a plurality of spokes extending radially from the lower portion to the upper portion.

In some embodiments, the upper portion extends along a majority of an outer lateral edge of the guard body.

In some embodiments, the guard assembly also includes an outer support connector that is mounted to the drive wheel support of the track assembly frame. The lower portion of the outer support member is fastened to the outer support connector.

In some embodiments, the guard assembly also includes an outer support sealing member mounted between the outer support connector and the drive wheel support of the track assembly frame to seal an interior of the drive wheel support.

In some embodiments, the front and rear inner support members are partially disposed laterally between opposite lateral edges of the endless track.

In some embodiments, the guard body has an inner lateral edge and an outer lateral edge, the inner lateral edge being laterally closer to a longitudinal centerplane of the vehicle than the outer lateral edge. The inner support member and the outer support member are disposed laterally between the inner and outer lateral edges of the guard body.

In some embodiments, the drive features of the at least one row of drive features of the endless track are drive holes extending through the endless track.

In some embodiments, the rigid portion of the guard body defines a notch along a lateral side thereof. The flexible portion of the guard body extends at least partly within the notch defined by the rigid portion.

In some embodiments, the guard body also extends over a portion of the endless track forward of the drive wheel.

In some embodiments, at least one lateral end portion of the guard body wraps over a corresponding lateral edge of the endless track.

In some embodiments, the track assembly is a first track assembly and the guard assembly is a first guard assembly. The vehicle also includes a second track assembly operatively connected to the vehicle frame and a second guard assembly connected to the second track assembly. The second track assembly includes a track assembly frame, an endless track having at least one row of drive features, and a plurality of track-engaging wheels. The plurality of track-engaging wheels includes a drive wheel rotatably connected to the track assembly frame and at least one idler wheel rotatably connected to the track assembly frame. The drive wheel is configured to engage the drive features of the endless track to rotate the endless track about the plurality of track-engaging wheels and thereby propel the vehicle. The second guard assembly includes a guard body positioned vertically above the endless track of the second track assembly, and at least one support member connecting the guard body of the second guard assembly to the track assembly frame of the second track assembly. At least a portion of the guard body of the second guard assembly extending over the drive wheel of the second track assembly.

In some embodiments, the endless tracks of the first and second track assemblies are front left and right ground-engaging members of the vehicle.

According to another aspect of the present technology, there is provided a guard assembly for use with a track assembly for a vehicle. The guard assembly includes a guard body. The guard body has a rigid portion made of a first polymeric material and a flexible portion made of a second polymeric material different from the first polymeric material. The first polymeric material has a greater modulus of elasticity than the second polymeric material.

In some embodiments, the guard body has an inner lateral edge and an outer lateral edge; and the flexible portion extends along at least a portion of the inner lateral edge of the guard body.

In some embodiments, the flexible portion extends along less than half of a width of the guard body.

In some embodiments, the flexible portion extends along less than half of a length of the guard body.

In some embodiments, the guard body has a front longitudinal edge and a rear longitudinal edge. The flexible portion is distanced from the front and rear longitudinal edges of the guard body.

In some embodiments, the rigid portion makes up a majority of the guard body.

In some embodiments, the rigid portion makes up at least 80% of the guard body.

In some embodiments, the flexible portion is fastened to the rigid portion.

In some embodiments, the guard body has an inner lateral end portion and an outer lateral end portion. The guard assembly also includes: an inner support member for connecting the guard body to a frame of the track assembly, the inner support member being connected to the inner lateral end portion of the guard body; and an outer support member for connecting the guard body to the frame of the track assembly, the outer support member being connected to the outer lateral end portion of the guard body.

In some embodiments, the inner support member is a first inner support member, and the guard assembly also includes a second inner support member connected to the inner lateral end portion of the guard body.

In some embodiments, the first inner support member is connected to the rigid portion of the guard body on a first longitudinal side of the flexible portion, and the second inner support member is connected to the rigid portion of the guard body on a second longitudinal side of the flexible portion.

In some embodiments, each of the first and second inner support members includes a rigid link having a first end and a second end. The first end of the rigid link is affixed to the guard body. The second end of the rigid link is configured to be affixed to a frame of the track assembly.

In some embodiments, the outer support member is made of polymeric material.

In some embodiments, the outer support member has an upper portion and a lower portion. The upper portion is connected to the outer lateral end portion of the guard body. The lower portion is configured to be connected to a drive wheel support of the frame of the track assembly.

In some embodiments, the outer support member includes a plurality of spokes extending radially from the lower portion to the upper portion.

In some embodiments, the upper portion extends along a majority of an outer lateral edge of the guard body.

In some embodiments, the guard assembly also includes an outer support connector that is configured to be mounted to the drive wheel support of the track assembly frame, the lower portion of the outer support member being configured to be fastened to the outer support connector.

In some embodiments, the guard body has an inner lateral edge and an outer lateral edge. The inner support member and the outer support member are disposed laterally between the inner and outer lateral edges of the guard body.

In some embodiments, the rigid portion of the guard body defines a notch along a lateral side thereof. The flexible portion of the guard body extends at least partly within the notch defined by the rigid portion.

For purposes of the present application, terms related to spatial orientation when referring to a vehicle and components in relation to the vehicle, such as "forwardly", "rearwardly", "left", "right", "above" and "below", are as they would be understood by a driver of the vehicle sitting thereon in an upright driving position, with the vehicle steered straight-ahead.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 3 is a perspective view, taken from a rear, right side, of a front right track assembly and a front right guard assembly of the vehicle of FIG. 1;

FIG. 4 is a perspective view, taken from a front, right side, of the track assembly and the guard assembly of FIG. 3;

FIG. 15 is a perspective view of the track assembly and the guard assembly of FIG. 3 and part of a corresponding suspension of the vehicle of FIG. 1.

DETAILED DESCRIPTION

Figure 1:
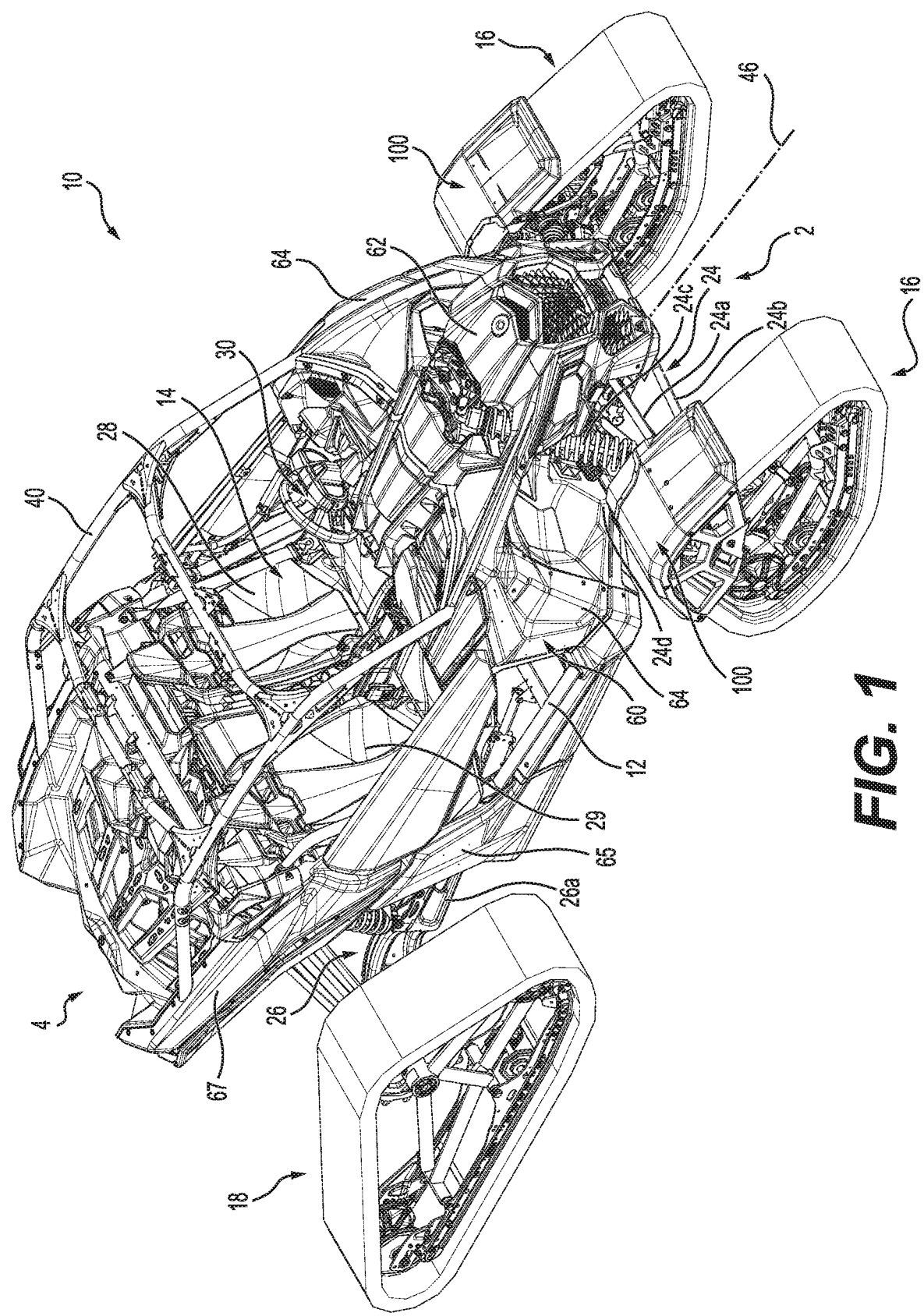
FIG. 1 is a perspective view, taken from a front, right side, of a side-by-side vehicle (SSV) provided with track assemblies.

The present technology will be described with respect to four-wheel, off-road vehicles having two side-by-side seats and a steering wheel (i.e. a side-by-side vehicle (SSV)). However, it is contemplated that at least some aspects of the present technology may apply to other types of vehicles including vehicles with more than two seats and vehicles equipped with track assemblies such as, but not limited to, off-road vehicles having a straddle seat and a handle bar (i.e. an all-terrain vehicle (ATV)) provided with track assemblies.

The general features of an off-road vehicle 10, specifically a side-by-side vehicle (SSV) 10, will be described with respect to FIGS. 1 and 2. The vehicle 10 has a front end 2 and a rear 4. The vehicle 10 has a frame 12 defining a central cockpit area 14 inside which are disposed a driver seat 28 and a passenger seat 29. In this embodiment, the driver seat 28 is disposed on the left side of the vehicle 10 and the passenger seat 29 is disposed on the right side of the vehicle 10. However, it is contemplated that the driver seat 28 could be disposed on the right side of the vehicle 10 and that the passenger seat 29 could be disposed on the left side of the vehicle 10. It is also contemplated that the vehicle 10 could include a single seat for the driver, or a larger number of seats, or a bench accommodating the driver and at least one passenger. It is also contemplated that the vehicle 10 could have one or more rows of seats behind the driver and passenger seats 28, 29. The vehicle 10 also includes a roll cage 40 connected to the frame 12 and extending at least partially over the seats 28, 29. The vehicle 10 also includes fairings 60 including a front fascia 62 at the front end 2 of the vehicle 10 and several side panels 64, 65, 67 extending over lateral sides of the vehicle 10. Notably, the side panels include left and right front fenders 64 and left and right rear fenders 67 which are respectively disposed at the front and rear wheel wells of the vehicle 10 to at least partly shield the vehicle 10 and/or occupant(s) thereof from snow or other ground matter being projected by the ground-engaging members of the vehicle 10. The front and rear fenders 64, 67 are fixed to the body of the vehicle 10.

The vehicle 10 includes left and right front track assemblies 16 connected to the frame 12 by a pair of front suspension assemblies 24, as well as left and right rear track assemblies 18 connected to the frame 12 by a pair of rear suspension assemblies 26. The front and rear suspension assemblies 24, 26 will be described in greater detail below. The left and right track assemblies 16, 18 are on opposite sides of a longitudinal centerplane 46 (FIG. 1) bisecting a width of the vehicle 10. In the present embodiment, the track assemblies 16, 18 are selectively replaceable with ground-engaging wheels.

The vehicle 10 includes a steering wheel 30 operatively connected to the front track assemblies 16 for controlling an angle of the front track assemblies 16. The driver operates the steering wheel 30 from the driver seat 28. The steering wheel 30 is disposed in front of the driver seat 28. The vehicle 10 also includes a dashboard 55 disposed forward of the seats 28, 29. A throttle operator in the form of a throttle pedal (not shown) is disposed over the floor of the cockpit area 14 below the steering wheel 30 and in front of the driver seat 28. A pedal position sensor (not shown) is operatively connected to the throttle pedal to sense movement of the pedal caused by the driver in operation.

Figure 2:
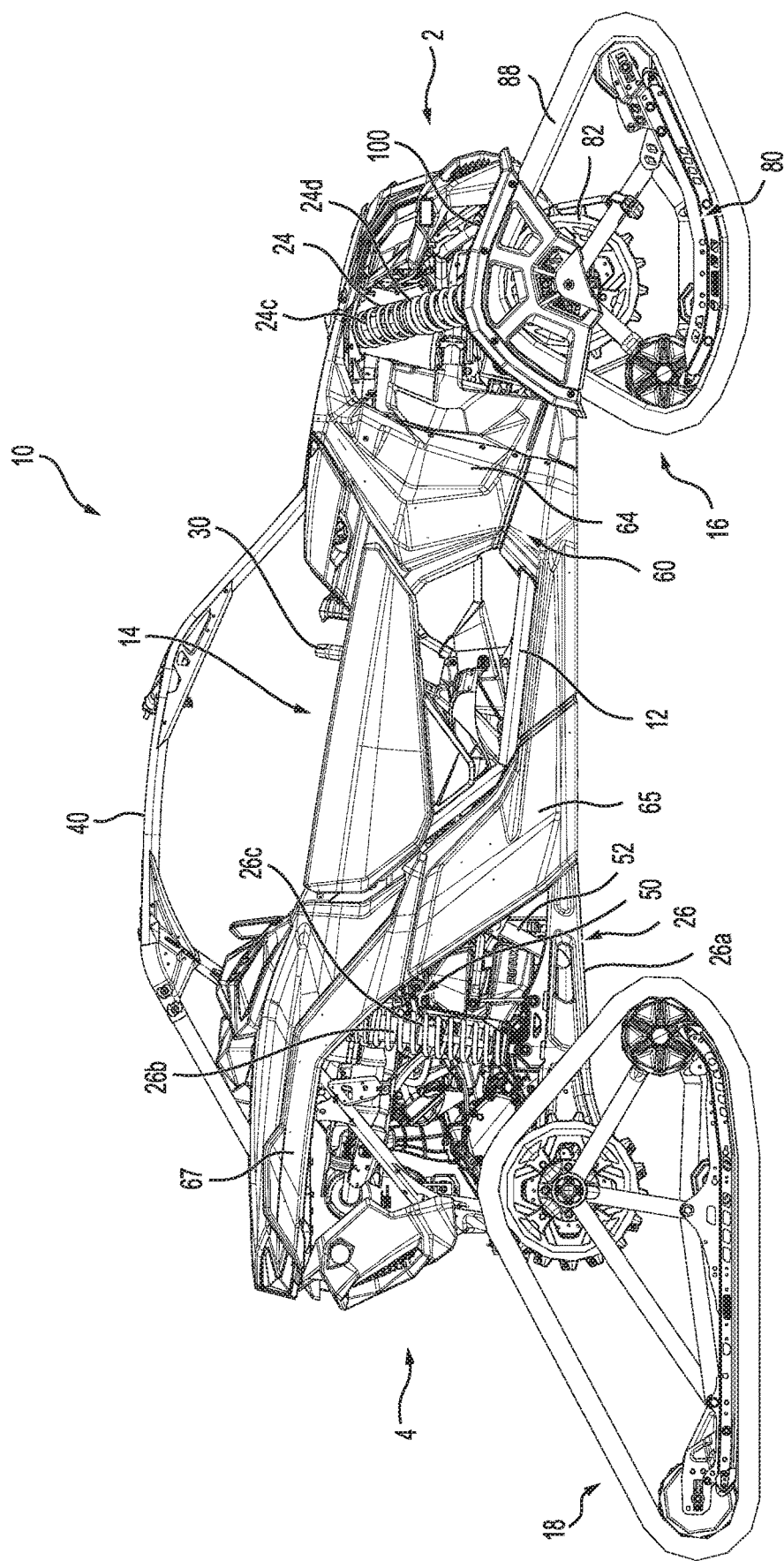
FIG. 2 is a right side elevation view the vehicle of FIG. 1.
Figure 6:
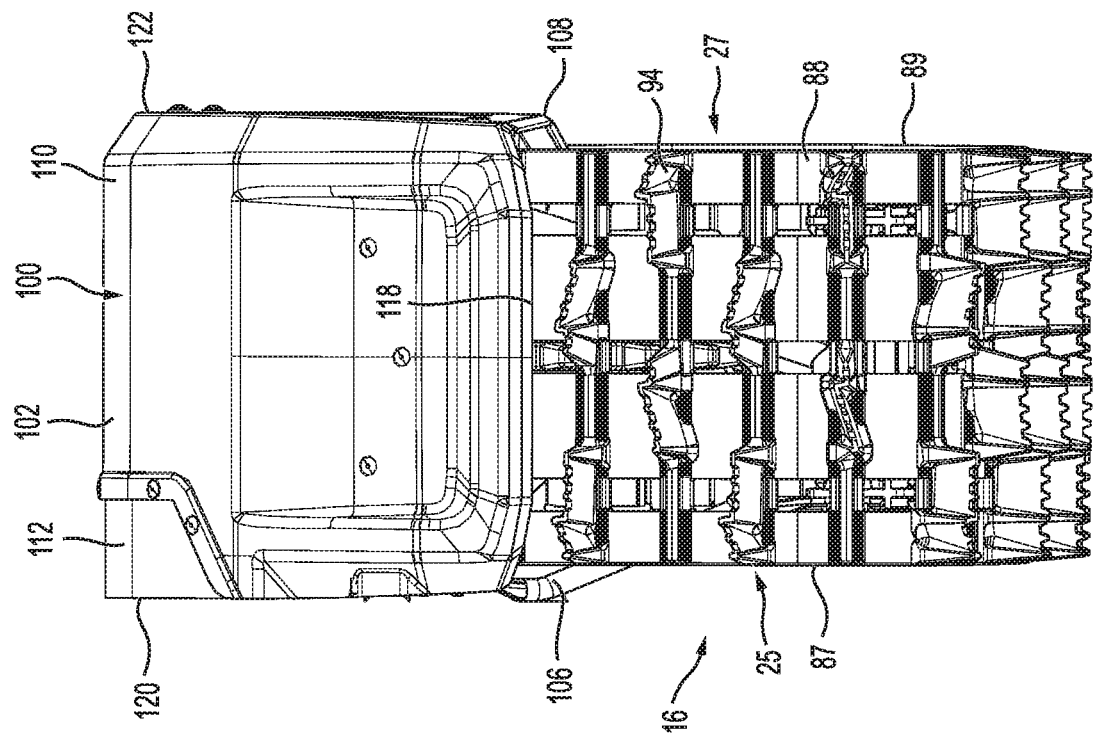
FIG. 6 is a rear elevation view of the track assembly and the guard assembly of FIG. 3.
Figure 5:
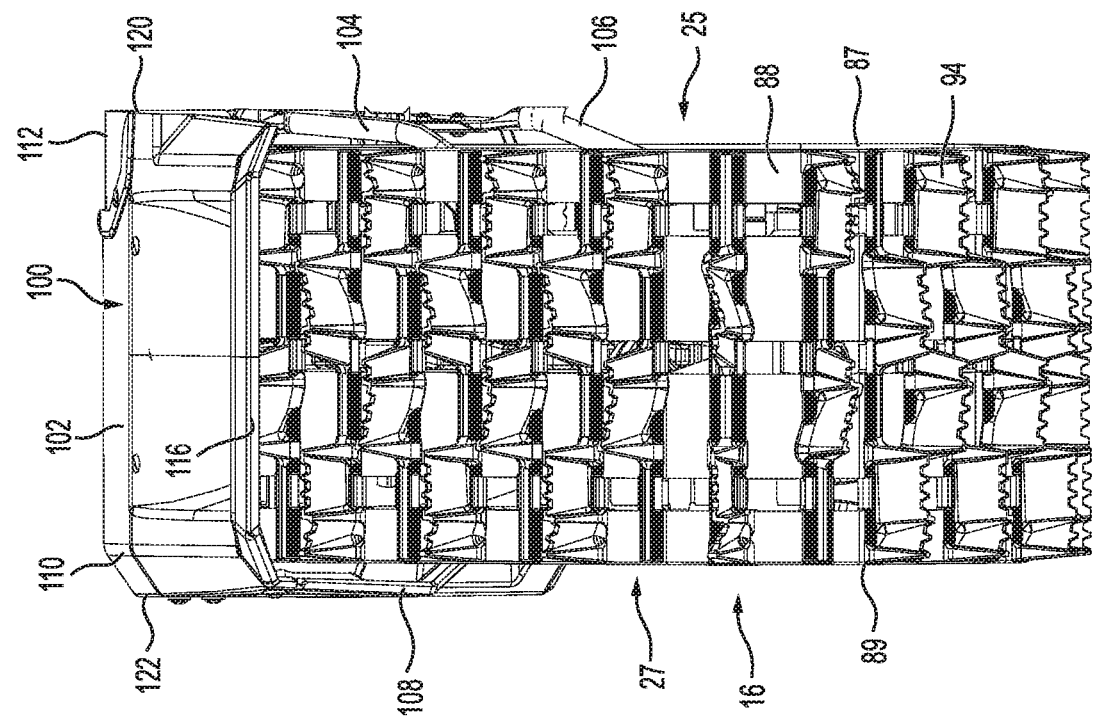
FIG. 5 is a front elevation view of the track assembly and the guard assembly of FIG. 3.

As can be seen in FIG. 2, a motor 50 is connected to the frame 12 in a rear portion of the vehicle 10. In the present implementation, the motor 50 is an internal combustion engine but the present technology is not so limited. It is contemplated that the engine 50 could be replaced by a hybrid or electric motor in some implementations. The vehicle 10 includes an engine control module (ECM) for monitoring and controlling various operations of the engine 50.

The motor 50 is connected to a transmission (not shown), specifically a continuously variable transmission (CVT) disposed on a left side of the motor 50. The CVT is operatively connected to a transaxle (not shown) to transmit torque from the motor 50 to the transaxle. The transaxle is operatively connected to the front and rear track assemblies 16, 18 to propel the vehicle 10. The motor 50 and the transmission are supported by the frame 12. Variants of the vehicle 10 having other transmission types are contemplated.

The transaxle is mechanically connected to a shifter disposed laterally between the two seats 28, 29. The shifter allows the driver to select from a plurality of combinations of engagement of gears of the transaxle, commonly referred to as gears. In the present implementation, the shifter allows the driver to select between a reverse gear, two forward gears (high and low) and a neutral position in which the transaxle does not transmit torque to the track assemblies 16, 18. It is contemplated that other types of connections between the shifter and the transaxle could be used.

As shown in FIGS. 1, 2 and 15, each front suspension assembly 24 includes an upper A-arm 24a, a lower A-arm 24b, a front shock absorber 24c and a front coil spring 24d. The front coil spring 24d is mounted over the front shock absorber 24c and is connected thereto via a fixed spring seat and an adjustable spring seat. The front shock absorber 24c is pivotably connected at its lower end to the upper A-arm 24a and at its upper end to the frame 12. The upper and lower A-arms 24a, 24b each have one end pivotably connected to the frame 12. A kingpin (not shown) is mounted to each opposed ends of the upper and lower A-arms 24a, 24b. Each front track assembly 16 is supported in part by its corresponding kingpin.

As shown in FIG. 2, each rear suspension assembly 26 comprises a swing arm 26a, a rear shock absorber 26b and a rear coil spring 26c. The rear coil spring 26c is mounted over the rear shock absorber 26b and is connected thereto via a fixed spring seat and an adjustable spring seat. Each swing arm 26a has one end pivotably connected to the frame 12, about a pivot axis located in front of the rear track assemblies 18 and extending generally laterally within the frame 12, and an opposite end supporting a driven shaft of its corresponding rear track assembly 18. Each swing arm 26a is connected near mid-length to a torsion bar 52. The torsion bar 52 is mounted to the frame 12 via supports. For each rear suspension assembly 26, the rear shock absorber 26b has one end pivotably connected to the frame 12 and the other end pivotably connected to its corresponding swing arm 26a.

It is contemplated that the vehicle 10 could be configured differently in other embodiments. The illustrated general construction of the vehicle 10 is thus not considered to be limiting to the present technology.

The front track assemblies 16 will be described in more detail below with reference to FIGS. 3 to 8. As the left and right front track assemblies 16 are mirror images of one another, only the right front track assembly 16 will be described in detail below. It should be understood that the left front track assembly 16 is configured similarly to the right front track assembly 16.

The front track assembly 16 has a frame 80 and a plurality of track-engaging wheels including a drive wheel 82, three middle idler wheels 84, a pair of rear corner idler wheels 85 and a pair of front corner idler wheels 86. The track-engaging wheels 82, 84, 85, 86 are rotationally connected to the frame 80. An endless track 88 is disposed around the track-engaging wheels 82, 84, 85, 86. The track 88 is the ground-engaging member of the vehicle 10. The track-engaging wheels 82, 84, 85, 86 define the path over which the track 88 moves. The path of the track 88 is defined in the upper portion by the drive wheel 82, in the rearward and forward portions by the rear and front corner idler wheels 85, 86, and in the bottom portion by the middle idler wheels 84 as well as by slide rails 76 of the frame 80. The track-engaging wheels 82, 84, 85, 86 are positioned so as to keep the track 88 tensioned. In particular, as shown in FIGS. 3 and 4, the track assembly 16 includes a track tensioning device 91 which is operable to adjust the longitudinal position of the rear corner idler wheels 85 to modify the tension in the track 88.

Figure 10:
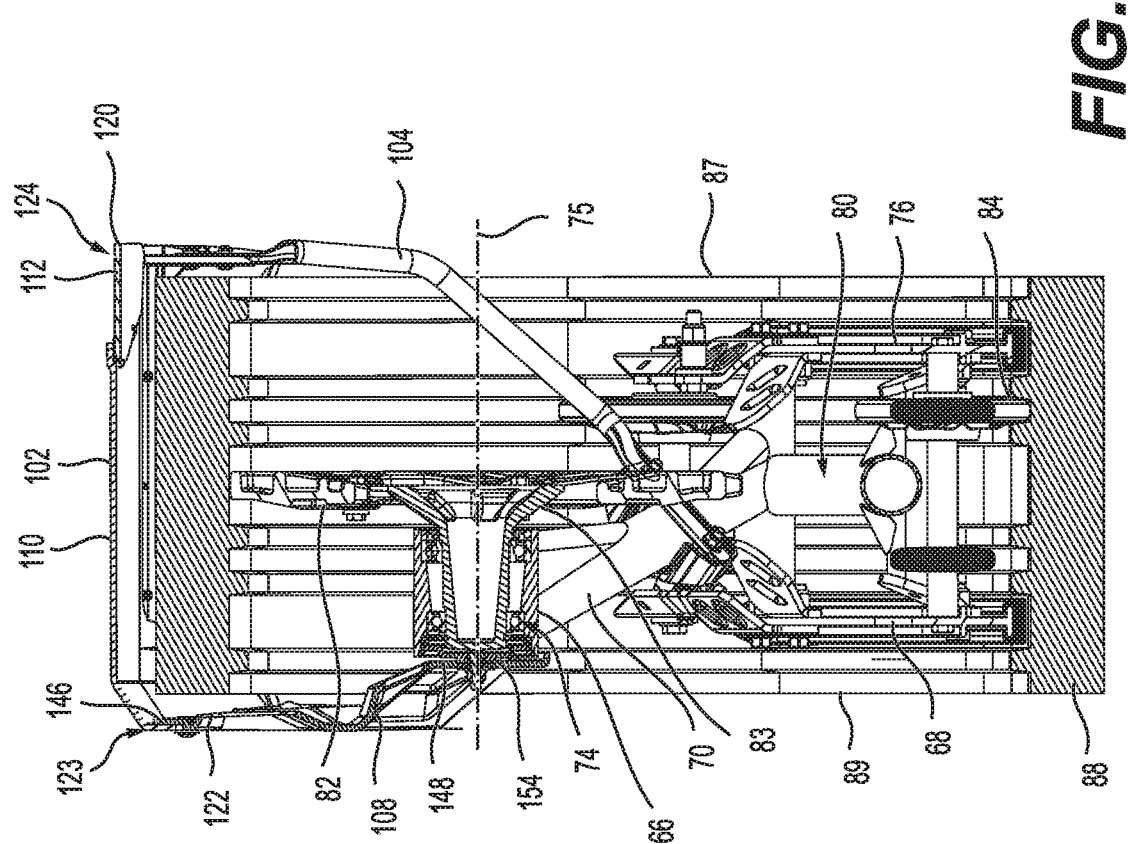
FIG. 10 is a cross-sectional view of the track assembly and the guard assembly of FIG. 3 taken along line 10-10 in FIG. 8.

The frame 80 of the track assembly 16 includes a drive wheel support 66, a lower wheel support 68 and two tubular rail members 70, 72 interconnecting the drive wheel support 66 and the lower wheel support 68. As shown in FIG. 10, the drive wheel support 66 rotatably supports the drive wheel 82 via a bearing assembly 74 such that the drive wheel 82 rotates about a drive wheel axis 75. The rail members 70, 72 include a front rail member 70 extending forwardly from the drive wheel support 66 and a rear rail member 72 extending rearwardly from the drive wheel support 66. The lower wheel support 68 includes two parallel longitudinal slide rails 76 which are laterally spaced from one another and generally equally distanced from opposite lateral edges 87, 89 of the track 88.

The middle idler wheels 84 are rotatably mounted to the slide rails 76 of the lower wheel support 68. More specifically, in this embodiment, one of the middle idler wheels 84 is rotatably mounted to the outer slide rail 76 while the other two middle idler wheels 84 are rotatably mounted to the inner slide rail 76. The middle idler wheels 84 are disposed laterally between the slide rails 76. In this embodiment, the track assembly 16 has three middle idler wheels 84. It is however contemplated that there could be more or less than three middle idler wheels 84. It is contemplated that the middle idler wheels 84 could be arranged as pairs of longitudinally aligned wheels (e.g., two pairs of longitudinally aligned middle idler wheels 84).

In this embodiment, the corner idler wheels 85, 86 are arranged in pairs of laterally spaced and longitudinally aligned left and right idler wheels. It is contemplated that at least some of the pairs of idler wheels 85, 86 could be a single wheel centered relative to the track 88.

The corner idler wheels 85, 86 are larger in diameter than the middle idler wheels 84. The larger diameter of the corner idler wheels 85, 86 helps to push snow on the ground ahead of the vehicle 10 under the vehicle 10 and also aids the vehicle 10 in moving over obstacles. It is also contemplated that the relative size of the track-engaging wheels 82, 84, 85, 86 could be different than as shown.

As shown in FIG. 10, the drive wheel 82 has a hub 83 that is mounted to the drive wheel support 66 of the frame 80 via the bearing assembly 74. More specifically, the hub 83 of the drive wheel 82 engages the bearing assembly 74 via a taper lock. A corresponding half shaft (not shown) operatively connects a front differential (which is in turn connected to the transaxle of the vehicle 10) to the drive wheel 82. The drive wheel 82 is laterally centered with respect to the track 88. The drive wheel 82 drives the track 88 with teeth 54 extending radially outwards from its rim and which engage complementary drive features 78 of the track 88 to rotate the track 88 about the drive wheel 82 and the idler wheels 84, 85, 86, thereby propelling the vehicle 10 over the ground. More specifically, the drive wheel 82 rotates about the drive wheel axis 75 to cause the track 88 to turn about the track-engaging wheels 82, 84, 85, 86.

While in this embodiment the drive wheel 82 is a sprocket wheel, it is contemplated that other types of drive wheels could be used in other embodiments.

Figure 7:
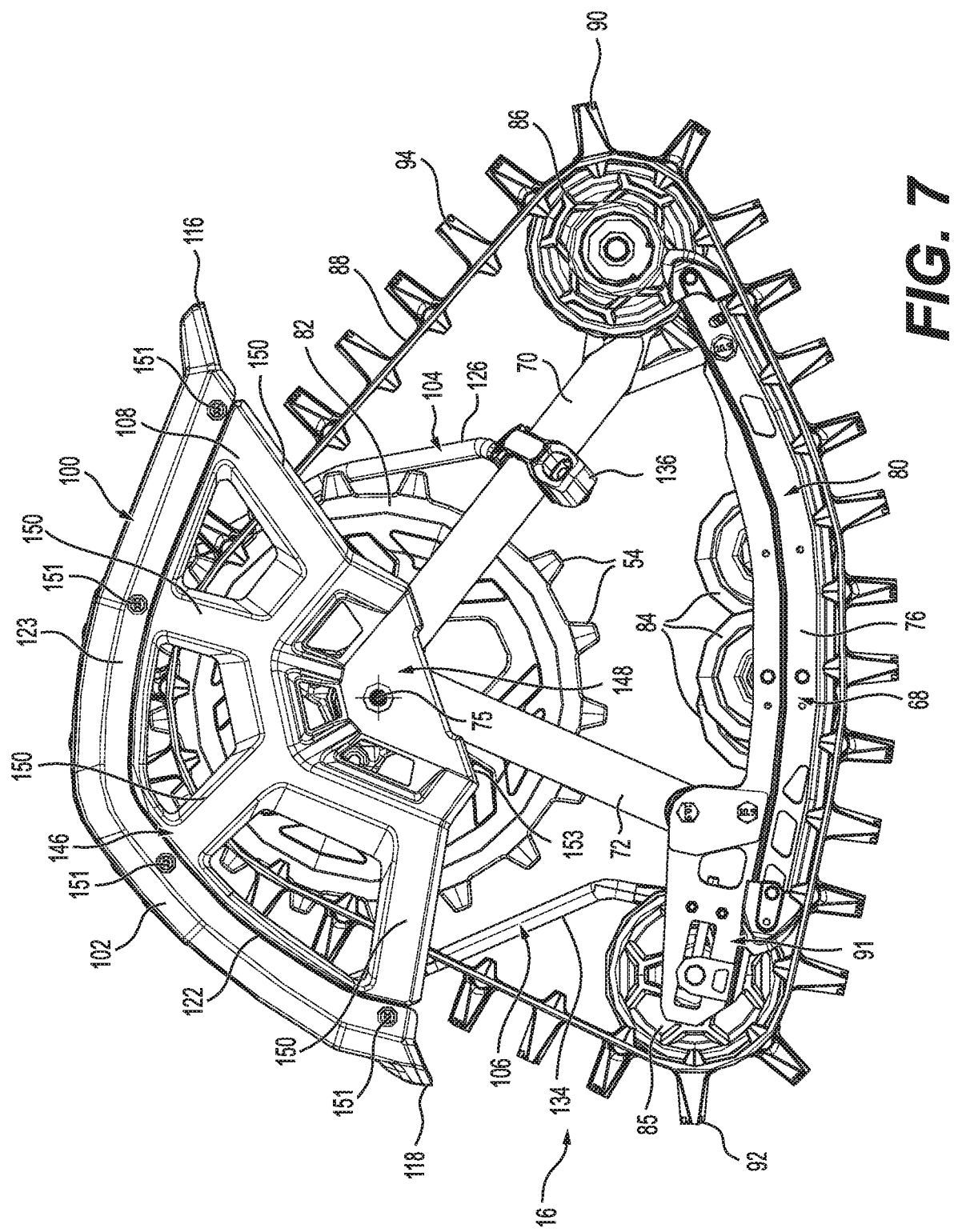
FIG. 7 is a right side elevation view of the track assembly and the guard assembly of FIG. 3.
Figure 8:
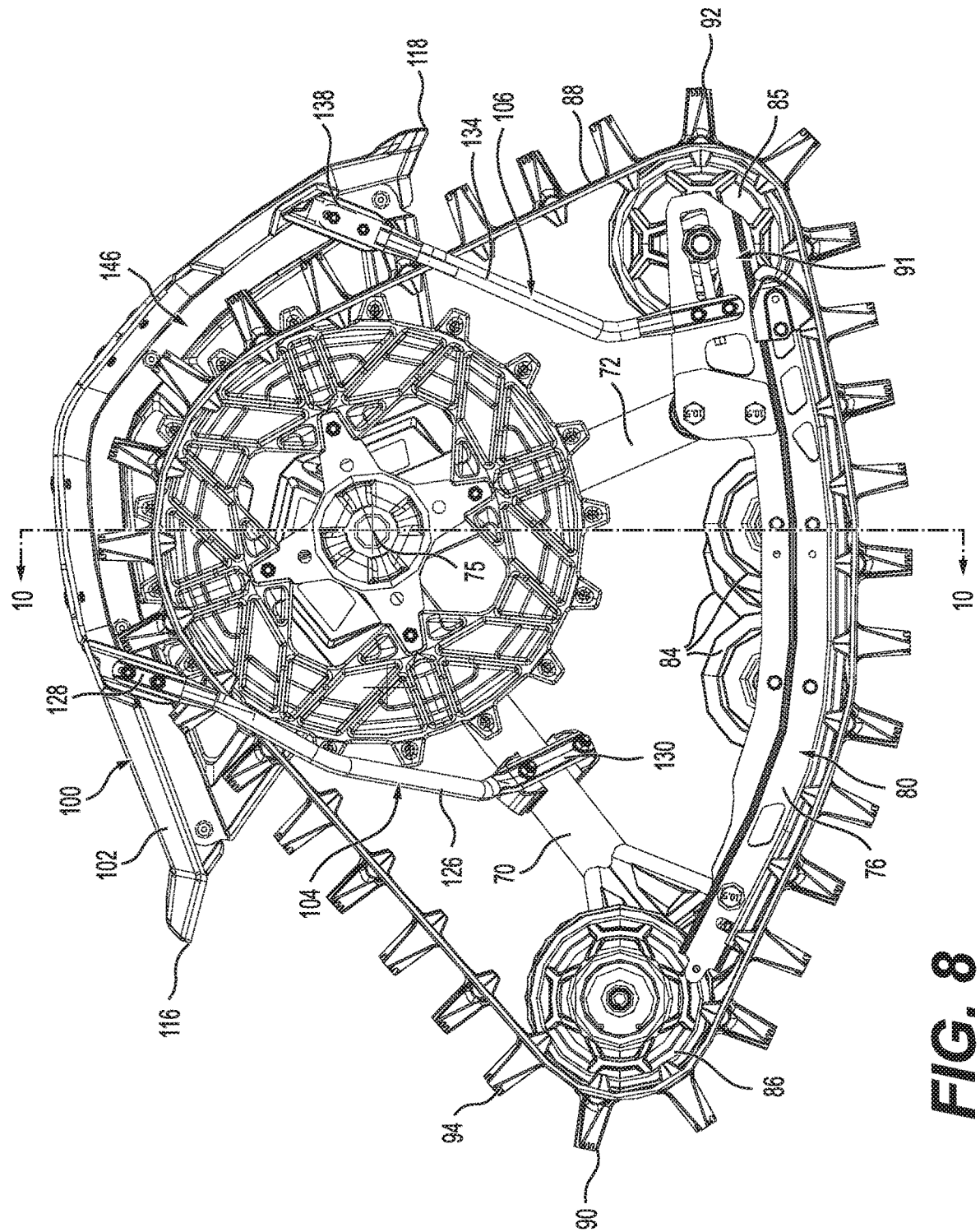
FIG. 8 is a left side elevation view of the track assembly and the guard assembly of FIG. 3.

As shown in FIGS. 7 and 8, the track assembly 16 has a front longitudinal end 90 and a rear longitudinal end 92 which define the length of the track assembly 16. The width of the track assembly 16 is defined by a width of the track 88 measured between the inner lateral edge 87 and the outer lateral edge 89 of the track 88 (the outer lateral edge 89 being the lateral edge facing outwardly away from a center of the vehicle 10 while the inner lateral edge 87 faces inwardly towards the center of the vehicle 10).

The track 88 has a body including elastomeric material (e.g., rubber) and reinforcements embedded within the elastomeric material. The inner surface of the track 88 has inner lugs projecting inwardly and which contact the sides of at least some of the idler wheels 84, 85, 86 for guiding the track 88. The outer surface of the track 88 has outer ground-engaging lugs 94 for providing traction on the ground. As briefly mentioned above, the track 88 has drive features 78 which, in use, are engaged by the teeth 54 of the drive wheel 82 to propel the vehicle 10. In this embodiment, the drive features 78 of the track 88 are drive holes which are configured to mesh with the teeth 54 of the drive wheel 82. The drive holes 78 extend through the track 88, from an inner side to an outer side of the track 88 and are arranged in a row along the length of the track 88. The row of drive holes 78 is generally centered between the opposite lateral edges 87, 89 of the track 88. It is contemplated that the drive features 78 of the track 88 could be one or more rows of inner drive lugs projecting inwardly on an inner side of the track 88 and which are engaged by teeth of an alternative embodiment of the drive wheel 82.

It is contemplated that, in other embodiments, the track assembly 16 could be configured differently from that described above. For example, any of the track-engaging wheels and the frame 80 could have any other suitable configuration in other embodiments. Thus, the construction of these components of the track assembly 16 is not considered to be limiting to the present technology.

Left and right guard assemblies 100 are connected to each of the left and right front track assemblies 16 to protect the vehicle 10 and the occupant(s) thereof from snow and/or debris projected upwards by the track assemblies 16 during operation of the vehicle 10. The right guard assembly 100 will now be described with respect to FIGS. 3 to 11. As the left and right guard assemblies 100 are mirror images of one another, only the right guard assembly 100 will be described in detail below. It should be understood that the left guard assembly 100 is configured similarly to the right guard assembly 100.

The guard assembly 100 includes a guard body 102 and support members 104, 106, 108 that connect the guard body 102 to the frame 80 of the corresponding track assembly 16 such that the guard body 102 moves with the corresponding track assembly 16. For instance, the guard body 102 moves up and down, as well as rotates left and right with the track assembly 16, for example when the track assembly 16 is steered or when the track assembly 16 rotates about a drive axis. The guard body 102 stops snow and/or debris from being projected upwards towards the occupant(s) of the vehicle 10. To that end, the guard body 102 is positioned vertically above the track 88 of the track assembly 16.

Figure 9:
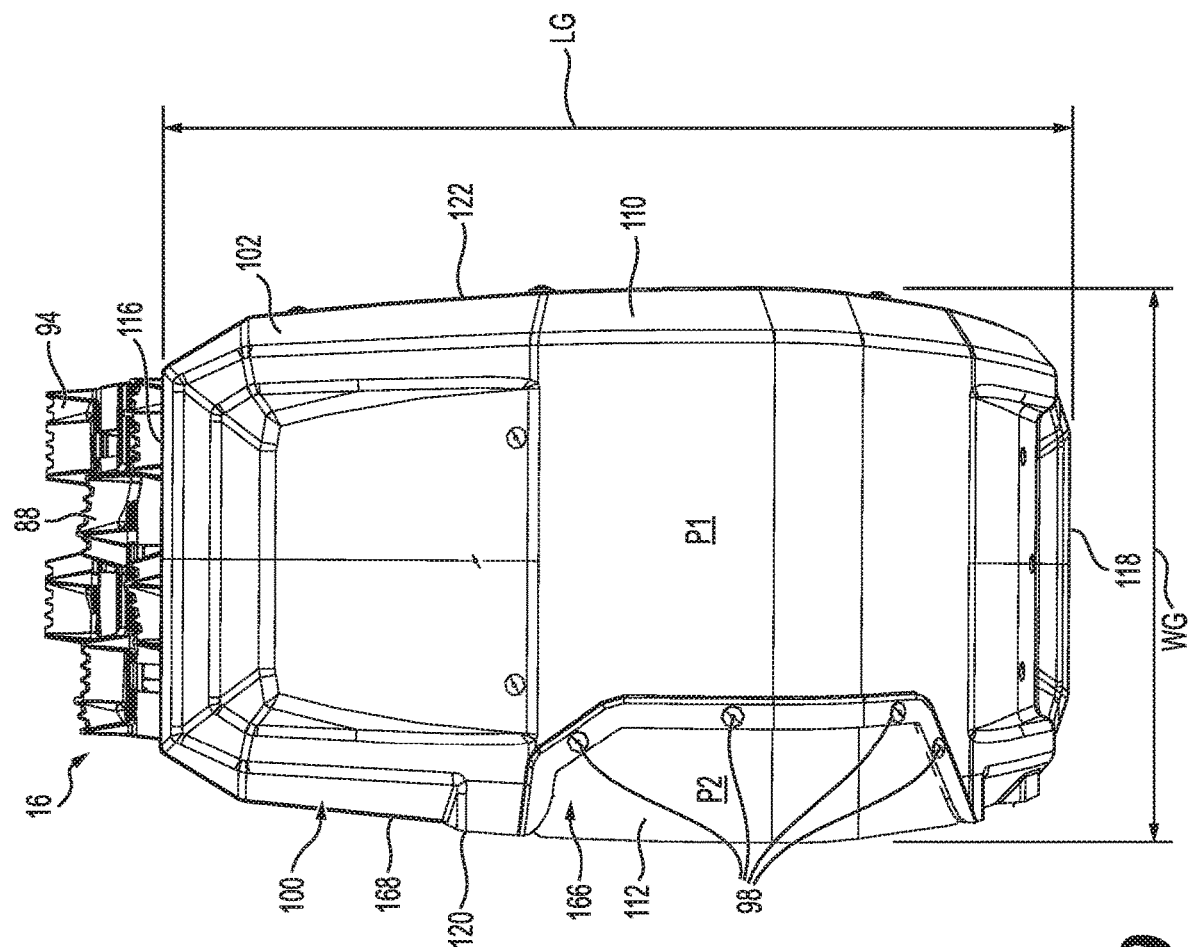
FIG. 9 is a top plan view of the track assembly and the guard assembly of FIG. 3.

As shown in FIGS. 7 to 9, the guard body 102 extends from a front longitudinal edge 116 to a rear longitudinal edge 118. The distance from the front longitudinal edge 116 to the rear longitudinal edge 118 defines a length LG of the guard body 102. As can be seen in FIGS. 7 and 8, when the vehicle 10 is at rest on flat horizontal ground, the front edge 116 is vertically higher than the rear edge 118. As shown in FIGS. 5, 6, 9 and 10, the guard body 102 also has an inner lateral edge 120 and an outer lateral edge 122 which define a width WG of the guard body 102 therebetween. The inner lateral edge 120 is closer to the longitudinal centerplane 46 of the vehicle 10 than the outer lateral edge 122. The guard body 102 is curved longitudinally to generally follow a profile of the track 88 along an upper portion of the track 88 longitudinally aligned with the drive wheel 82. The guard body 102 is shaped and dimension such that the guard body 102 is kept relatively close to the track 88. This keeps snow and/or debris from being projected too far from the track assembly 16 and also allows the dimensions of the guard body 102 to be kept relatively small which in turn reduces the weight added to the vehicle 10 by the guard assembly 100.

The guard body 102 is positioned to extend over the drive wheel 82 of the track assembly 16 since snow and/or debris is projected upward from the drive wheel 82 due to a centrifugal experienced as the track 88 is driven around the drive wheel 82. The guard body 102 also extends over a portion of the track 88 forward of the drive wheel 82. Moreover, the guard body 102 is dimensioned and positioned such that the guard body 102 spans the width of the track 88. Notably, in this embodiment, the guard body 102 extends laterally beyond each of the lateral edges 87, 89 of the track 88. As shown in FIG. 10, in this embodiment, an outer lateral end portion 123 of the guard body 102 defining the outer lateral edge 122 wraps over the outer lateral edge 89 of the track 88. It is contemplated that an inner lateral end portion 124 of the guard body 102 defining the inner lateral edge 120 could also wrap around the inner lateral edge 87 of the track 88 in other embodiments.

As can be seen in FIGS. 3, 4 and 9, the guard body 102 has a rigid portion 110 and a flexible portion 112 which are made of different polymeric materials. The rigid portion 110 is made of a rigid polymeric material P1 while the flexible portion 112 is made of a flexible polymeric material P2 different from the rigid polymeric material P1. More specifically, in this embodiment, the rigid polymeric material P1 is high molecular weight polyethylene (HMWPE) and the flexible polymeric material P2 is ethylene propylene diene monomer (EPDM) rubber. The rigid and flexible polymeric materials P1, P2 may be any other suitable rigid and flexible polymeric materials in other embodiments. For example, in other embodiments, the rigid polymeric material P1 could be high density polyethylene (HDPE).

The rigid polymeric material P1 has a modulus of elasticity that is greater than a modulus of elasticity of the flexible polymeric material P2. In this context, the rigid polymeric material P1 of the rigid portion 110 is considered to be "rigid" when a flexural modulus of the rigid polymeric material P1 is equal to or greater than 800 MPa, such as between 800 and 1600 MPa inclusively. For instance, in this embodiment, the flexural modulus of the rigid polymeric material P1 is approximately 1240 MPa. Moreover, in this context, the flexible polymeric material P2 of the flexible portion 112 is considered to be "flexible" when a flexural modulus of the flexible polymeric material P2 is equal to or less than 100 MPa, such as between 0.5 and 100 MPa inclusively. For instance, in this embodiment, the flexural modulus of the flexible polymeric material P2 is approximately 5 MPa. As such, the flexural modulus of the rigid polymeric material P1 could be more than one hundred times greater than the flexural modulus of the flexible polymeric material P2. For instance, in this embodiment, the flexural modulus of the rigid polymeric material P1 is more than two hundred times greater than the flexural modulus of the flexible polymeric material P2.

Furthermore, in this embodiment, the flexible polymeric material P2 of the flexible portion 112 is softer than the rigid polymeric material P1 of the rigid portion 110. In other words, the rigid polymeric material P1 has a greater hardness than the flexible polymeric material P2. For instance, the flexible polymeric material P2 has a shore A hardness that is less than 90, such as between 40 and 90 inclusively. Meanwhile, the rigid polymeric material P1 has a shore D hardness that is greater than 50, such as between 50 and 80.

Figure 14:
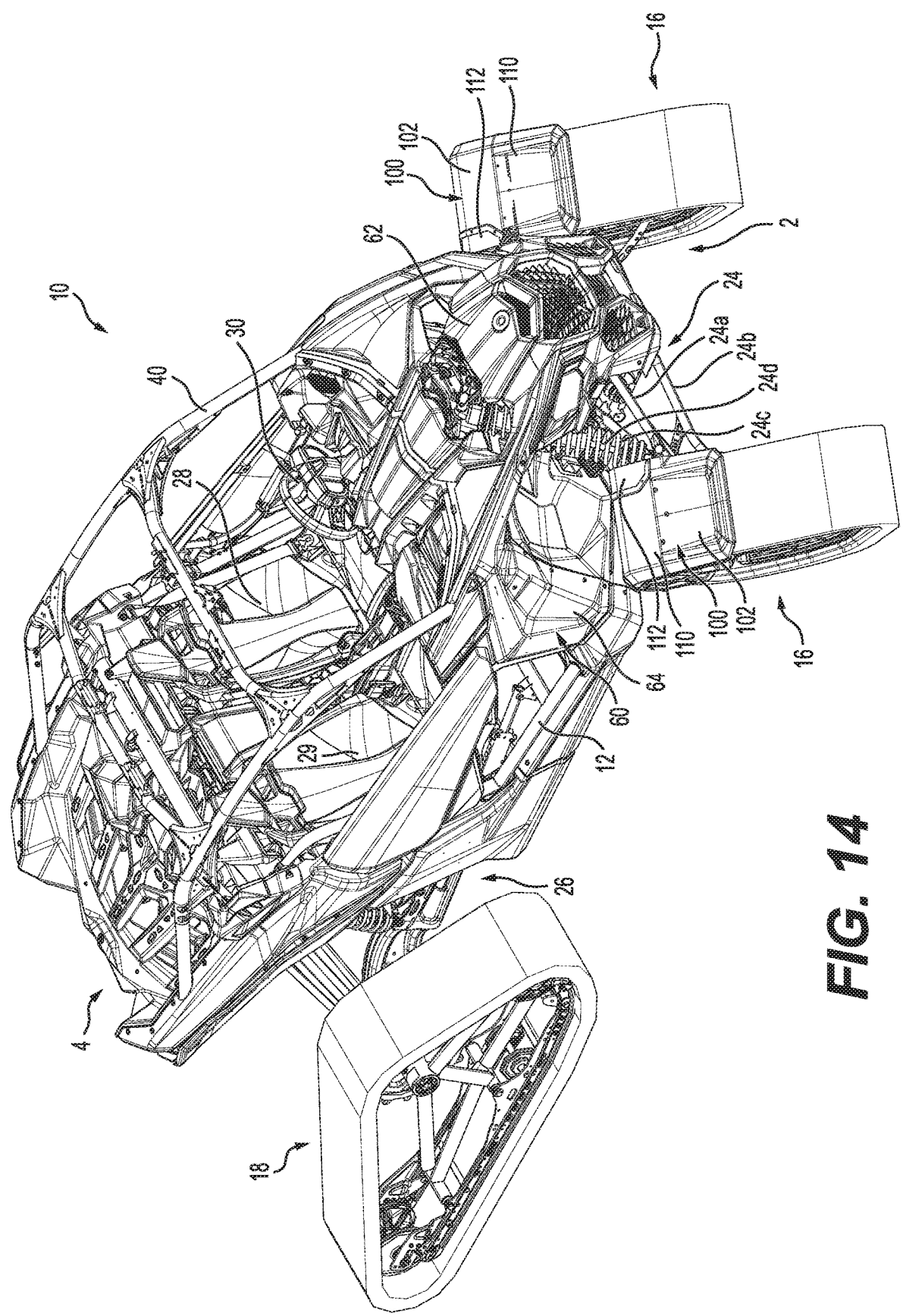
FIG. 14 is a perspective view, taken from a front, right side, of the vehicle of FIG. 1 steered to make a right turn.

The provision of the flexible portion 112 can be helpful to avoid damaging the guard body 102. Notably, as the guard body 102 is longitudinally aligned with the shock absorber 24d of the front suspension assembly 24, when the front portion of the track assembly 16 is steered inwardly (i.e., toward a center of the vehicle 10) beyond a certain steering angle (as illustrated for example in FIG. 14 for the left track assembly 16) or when the shock absorber 24d moves within a certain range, in some steering and suspension positions, the corresponding shock absorber 24d can come into contact with the guard body 102. Therefore, in order to protect the rigid polymeric material P1 of the guard body 102 from potential damage when contacting the shock absorber 24d, the flexible portion 112 extends along a portion of the inner lateral edge 120 of the guard body 102 and is longitudinally aligned with the shock absorber 24d.

Thus, as can be seen in FIG. 15, when the flexible portion 112 contacts the shock absorber 24d during use, the flexible portion 112 elastically deforms to a deformed state. However, when the flexible portion 112 is no longer in contact with the shock absorber 24d (e.g., when the steering angle is reduced), the flexible portion 112 returns to its undeformed state, shown for example in FIGS. 3 to 10.

As such, the flexible portion 112 needs not define a significant surface area of the guard body 102. For instance, in this embodiment, the flexible portion 112 extends along less than half of the width of the guard body 102 and along less than half of the length of the guard body 102. For example, the flexible portion 112 is distanced from the front and rear longitudinal edges 116, 118 of the guard body 102. Thus, the rigid portion 110 makes up a majority of the guard body 102. For example, the rigid portion 110 can make up 80% of the guard body 102 or more.

Figure 11:
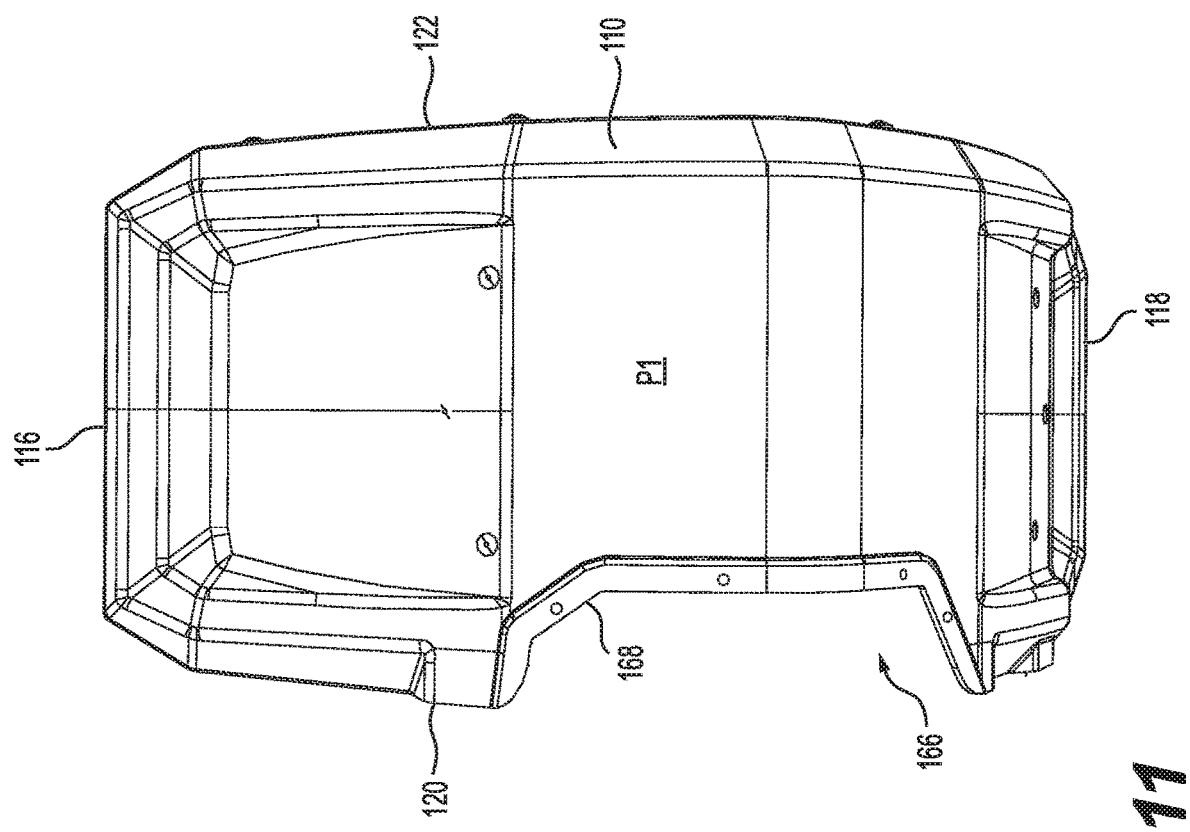
FIG. 11 is a top plan view of a rigid portion of a guard body of the guard assembly of FIG. 3.

In particular, in this embodiment, with reference to FIGS. 9 and 11, the flexible portion 112 extends within a notch 166 defined by the rigid portion 110. Notably, the notch 166 is defined by an inner lateral edge 168 of the rigid portion 110 which also makes up part of the inner lateral edge 120 of the guard body 102.

In this embodiment, the rigid and flexible portions 110, 112 of the guard body 102 are fastened to one another via fasteners 98 (FIG. 9) disposed along corresponding edges of the rigid and flexible portions 110, 112. It is contemplated that the rigid and flexible portions 110, 112 could be affixed to one another in any other suitable way in other embodiments.

With reference to FIGS. 7 and 8, the support members 104, 106, 108 of the guard assembly 100 include front and rear inner support members 104, 106 and an outer support member 108. The front and rear inner support members 104, 106 support the guard body 102 on a lateral inner side thereof while the outer support member 108 supports the guard body 102 on a lateral outer side thereof. Therefore, the front and rear inner support members 104, 106 are disposed on a lateral inner side 25 of the track assembly 16 while the outer support member 108 is disposed on a lateral outer side 27 of the track assembly 16. The rear inner support member 106 is disposed rearward of the front inner support member 104. It is contemplated that, in some embodiments, the outer support member 108 may be omitted and that only the inner support members 104, 106 may be provided.

As shown in FIG. 8, the front and rear inner support members 104, 106 are connected between the guard body 102 and the frame 80 of the track assembly 16. More specifically, in this embodiment, the front inner support member 104 is connected to the rigid portion 110 of the guard body 102 and the front rail member 70 of the frame 80. The rear inner support member 106 is connected between the rigid portion 110 of the guard body 102 and the slide rail 76 of the frame 80. As can be seen in FIG. 10 for the front inner support member 104, both the front and rear inner support members 104, 106 are disposed laterally between the inner and outer lateral edges 120, 122 of the guard body 102 and partially disposed laterally between the opposite lateral edges 87, 89 of the track 88.

The front inner support member 104 includes a rigid link 126 having an upper end 128 and a lower end 130. The upper end 128 of the rigid link 126 is affixed to the rigid portion 110 forwardly of the flexible portion 112 via a connecting mount 132 (FIG. 13) defined on an inner lateral side of the guard body 102. Notably, in this embodiment, the upper end 128 is fastened to the connecting mount 132 via fasteners 134 which engage mounting posts 133 of the connecting mount 132. The lower end 130 of the rigid link 126 is affixed to the front rail member 70 of the frame 80. Notably, in this embodiment, the lower end 130 of the rigid link 126 is fastened to a clamp member 136 such that a portion of the front rail member 70 is clamped between the clamp member 136 and the lower end 130. It is contemplated that, in other embodiments, the clamp member 136 may be omitted and that the front rail ember 70 may be configured to receive and secure the lower end 130 of the rigid link 126.

The rear inner support member 106 includes a rigid link 134 having an upper end 138 and a lower end 140. The upper end 138 of the rigid link 134 is affixed to the rigid portion 110 rearwardly of the flexible portion 112 via a connecting mount 142 (FIG. 13) defined on the inner lateral side of the guard body 102. Notably, in this embodiment, the upper end 138 is fastened to the connecting mount 140 via fasteners 143 which engage mounting posts 144 of the connecting mount 142. The lower end 140 of the rigid link 134 is fastened to the laterally innermost slide rail 76 of the lower wheel support 68.

In this embodiment, the rigid links 126, 134 of the inner support members 104, 106 are made of metal.

The outer support member 108 supports the lateral outer side of the guard body 102 to minimize contact between the outer lateral side of the guard body 102 and the track 88. As shown in FIGS. 7 and 10, the outer support member 108 is connected between the guard body 102 and the drive wheel support 66 of the frame 80. Notably, an upper portion 146 of the outer support member 108 is connected to the outer lateral end portion 123 of the guard body 102. In this embodiment, the upper portion 146 is fastened to the outer lateral end portion 123 of the guard body 102 via fasteners 151. The upper portion 146 of the outer support member 108 extends along a majority of the outer lateral edge 122 of the guard body 102. For instance, in this embodiment, the upper portion 146 of the outer support member 108 extends along an entirety of the outer lateral edge 122 of the guard body 102.

As shown in FIGS. 7 and 10, a lower portion 148 of the outer support member 108 is connected to the drive wheel support 66. As such, the drive wheel axis 75 extends through the lower portion 148 of the outer support member 108. In this embodiment, a lower edge 153 of the outer support member 108, defined by the lower portion 148, is disposed above a lowermost point of the drive wheel 82. In other words, the lower portion 148 does not extend lower than the drive wheel 82.

In this embodiment, the outer support member 108 has a plurality of spokes 150 which extend radially between and connect the upper and lower portions 146, 148.

Figure 12:
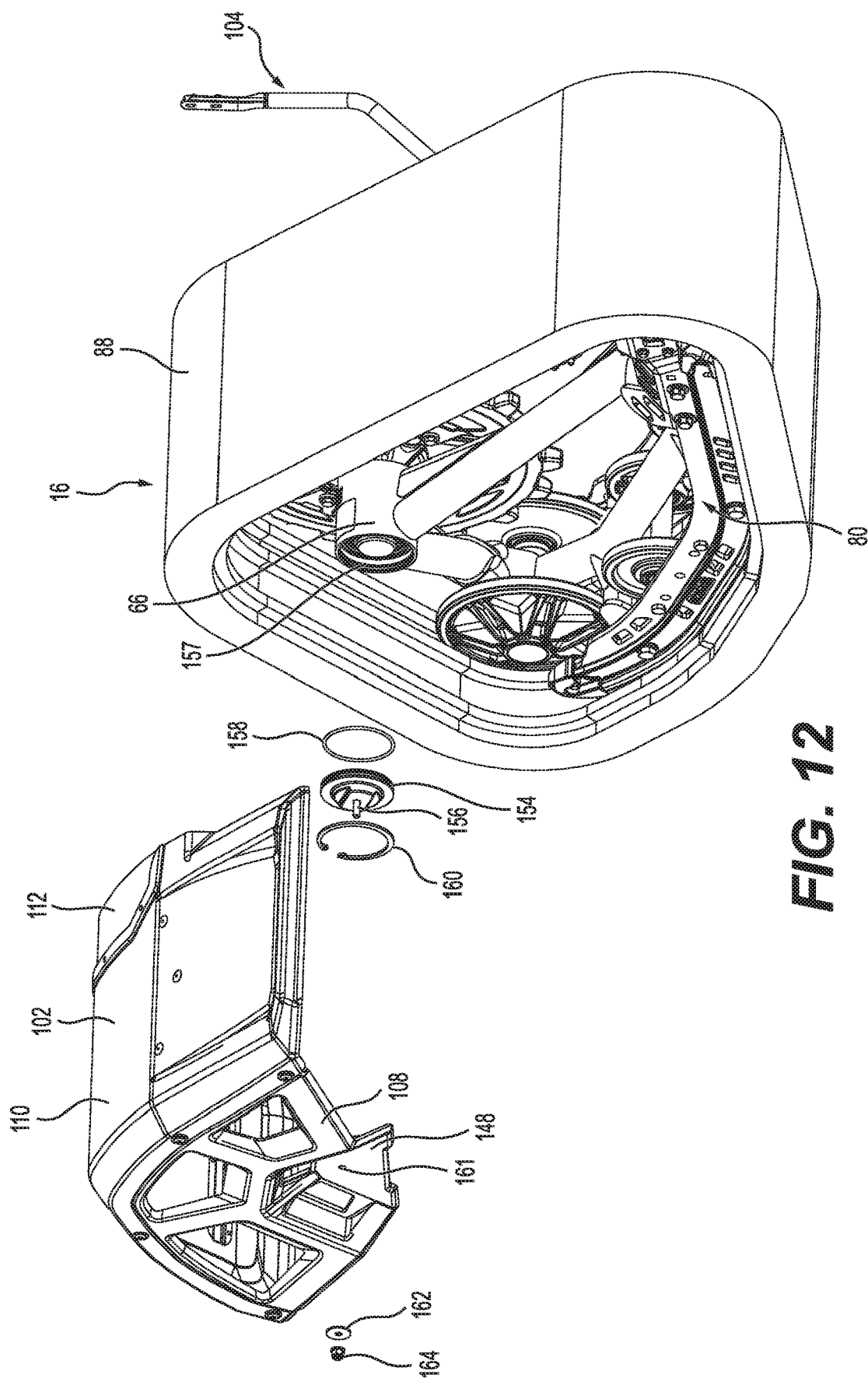
FIG. 12 is a partially exploded view of the track assembly and the guard assembly of FIG. 3.
Figure 13:
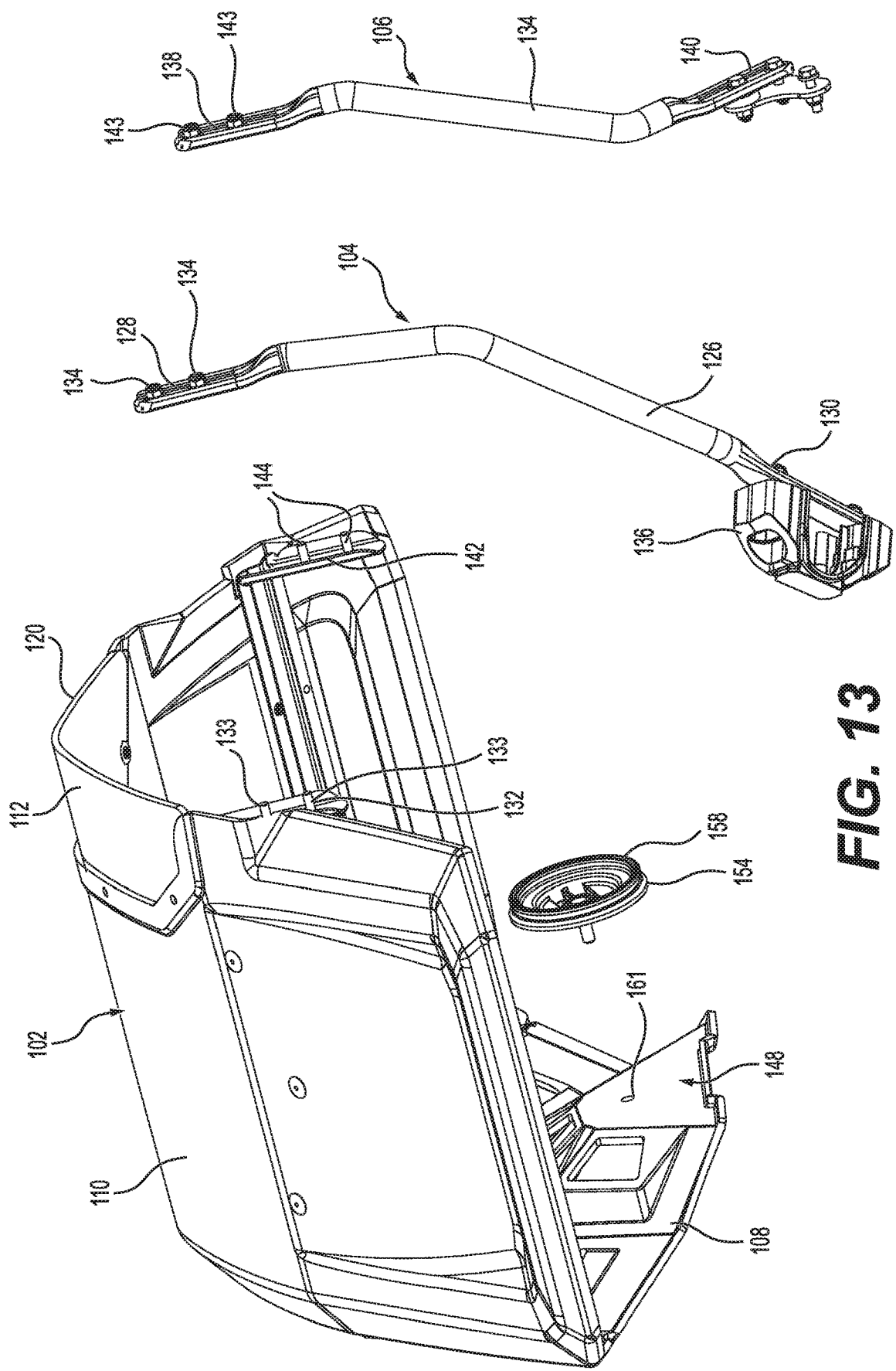
FIG. 13 is a partially exploded view of the guard assembly of FIG. 3.

As shown in FIGS. 10, 12 and 13, in order to connect the lower portion 148 of the outer support member 108 to the drive wheel support 66, in this embodiment, the guard assembly 100 includes an outer support connector 154 which is mounted to the drive wheel support 66 of the frame 80. Notably, as shown in FIG. 12, the outer support connector 154 is generally circular and is partially inserted within a cylindrical recess 157 defined by the drive wheel support 66, between the bearing assembly 74 and an outer lateral end of the drive wheel support 66. The outer support connector 154 has a threaded shaft 156 which, when the outer support connector 154 is in place in the recess 157, extends along the drive wheel axis 75. In order to seal an interior of the drive wheel support 66 and thus protect the bearing assembly 74, an outer support sealing member 158 is mounted between the outer support connector 154 and the drive wheel support 66. In this embodiment, the sealing member 158 is a rubber O-ring. Once the outer support connector 154 is in place in the recess 157, a C-clip 160 is also inserted within the recess 157, between the outer support connector 154 and the outer lateral end of the drive wheel support 66, to keep the outer support connector 154 secured within the recess 157.

As shown in FIG. 13, the lower portion 148 of the outer support member 108 defines an opening 161 which receives therein the threaded shaft 156 of the outer support connector 154. In order to fasten the lower portion 148 of the outer support member 108 to the outer support connector 154 (and thereby affix the lower portion 148 to the drive wheel support 66), the threaded shaft 156 is received through the opening 161 and engaged by a washer 162 and a complementary fastener 164 (e.g., a nut).

The outer support member 108 is made relatively resilient. To that end, the outer support member 108 is made of polymeric material. It is contemplated that a flexural modulus of the polymeric material of the outer support member 108 could be equal to or less than 2000 MPa, such as between 800 and 1600 MPa inclusively. In this embodiment, the outer support member 108 is made from HMWPE and the flexural modulus of the outer support member 108 is thus approximately 1240 MPa. The outer support member 108 could be made from other polymeric materials in other embodiments such as EPDM for example.

The resilience of the outer support member 108 as imparted by the polymeric material from which it is made allows the outer support member 108 to deform elastically to some extent and spring back to its original shape. This can be useful since, given its laterally outer position, the outer support member 108 can come into contact with obstacles (e.g., trees, rocks, etc.) during operation of the vehicle 10. When contacting obstacles with some force, the outer support member 108 momentarily deforms which can cause the outer support member 108 and/or the guard body 102 supported thereby to momentarily come into contact with the track 88. However, due to the resilience of the outer support member 108, the outer support member 108 springs back to its original shape once the obstacle has been overcome. In contrast, if the outer support member 108 were made from a non-resilient material, it could in some cases get permanently bent when contacting obstacles which may potentially cause the outer support member 108 and/or the guard 102 to remain in a position in which they interfere with the track 88.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A guard assembly for use with a track assembly for a vehicle, the guard assembly comprising:
    a guard body comprising:
        a rigid portion made of a first polymeric material; and
        a flexible portion made of a second polymeric material different from the first polymeric material, the first polymeric material having a greater modulus of elasticity than the second polymeric material,
        the flexible portion being configured to deform to a deformed state in response to the flexible portion contacting a shock absorber of a suspension assembly of the vehicle and to return to an undeformed state in response to the flexible portion no longer being in contact with the shock absorber.

2. The guard assembly of claim 1, wherein:
the guard body has an inner lateral edge and an outer lateral edge; and
the flexible portion extends along at least a portion of the inner lateral edge of the guard body.

3. The guard assembly of claim 1, wherein:
the guard body has an inner lateral end portion and an outer lateral end portion; and
the guard assembly further comprises:
an inner support member for connecting the guard body to a frame of the track assembly, the inner support member being connected to the inner lateral end portion of the guard body; and
an outer support member for connecting the guard body to the frame of the track assembly, the outer support member being connected to the outer lateral end portion of the guard body.

4. The guard assembly of claim 3, wherein:
the inner support member is a first inner support member;
the guard assembly further comprises a second inner support member connected to the inner lateral end portion of the guard body;
each of the first and second inner support members comprises a rigid link having a first end and a second end;
the first end of each rigid link is affixed to the guard body; and
the second end of each rigid link is configured to be affixed to a frame of the track assembly.

5. The guard assembly of claim 3, wherein the outer support member is made of polymeric material.

6. The guard assembly of claim 3, wherein:
the outer support member has an upper portion and a lower portion;
the upper portion is connected to the outer lateral end portion of the guard body;
the lower portion is configured to be connected to a drive wheel support of the frame of the track assembly.

7. The guard assembly of claim 6, further comprising an outer support connector that is configured to be mounted to the drive wheel support of the track assembly frame, the lower portion of the outer support member being configured to be fastened to the outer support connector.

8. The guard assembly of claim 1, wherein:
the rigid portion of the guard body defines a notch along a lateral side thereof; and
the flexible portion of the guard body extends at least partly within the notch defined by the rigid portion.

9. A vehicle comprising:
a vehicle frame;
a motor supported by the vehicle frame;
a track assembly operatively connected to the vehicle frame, the track assembly comprising:
a track assembly frame;
an endless track having at least one row of drive features; and
a plurality of track-engaging wheels, including:
a drive wheel rotatably connected to the track assembly frame, the drive wheel being configured to engage the drive features of the endless track to rotate the endless track about the plurality of track-engaging wheels and thereby propel the vehicle; and
at least one idler wheel rotatably connected to the track assembly frame;
a suspension assembly operatively connecting the track assembly to the vehicle frame, the suspension assembly comprising a shock absorber;
and
a guard assembly connected to the track assembly, the guard assembly comprising:
a guard body positioned vertically above the endless track, at least a portion of the guard body extending over the drive wheel, the guard body being made of a first polymeric material and a second polymeric material different from the first polymeric material, the first polymeric material having a greater modulus of elasticity than the second polymeric material, the guard body comprising:
a rigid portion made of the first polymeric material; and
a flexible portion made of the second polymeric material, the flexible portion being longitudinally aligned with the shock absorber,
during use, the flexible portion deforms to a deformed state in response to the flexible portion contacting the shock absorber and returns to an undeformed state in response to the flexible portion no longer being in contact with the shock absorber;
and
at least one support member connecting the guard body to the track assembly frame.

10. The vehicle of claim 9, wherein:
the guard body has an inner lateral edge and an outer lateral edge, the inner lateral edge being laterally closer to a longitudinal centerplane of the vehicle than the outer lateral edge; and
the flexible portion extends along at least a portion of the inner lateral edge of the guard body.

11. The vehicle of claim 9, wherein the guard body spans at least a width of the endless track.

12. The vehicle of claim 9, wherein the at least one support member of the guard assembly comprises:
an inner support member disposed on a lateral inner side of the track assembly; and
an outer support member disposed on a lateral outer side of the track assembly.

13. The vehicle of claim 12, wherein:
the inner support member is a front inner support member;
the at least one support member further comprises a rear inner support member, the rear inner support member being disposed on the lateral inner side of the track assembly rearward of the front inner support member;
each of the front and rear inner support members comprises a rigid link having a first end and a second end;
the first end of each rigid link is affixed to the guard body; and
the second end of each rigid link is affixed to the track assembly frame.

14. The vehicle of claim 12, wherein:
the track assembly frame comprises a drive wheel support rotatably supporting the drive wheel;
the outer support member is connected to the guard body and the drive wheel support;
the outer support member has an upper portion connected an outer lateral end portion of the guard body;
the outer support member has a lower portion connected to the drive wheel support of the track assembly frame; and the guard assembly further comprises:
- an outer support connector that is mounted to the drive wheel support of the track assembly frame, the lower portion of the outer support member being fastened to the outer support connector;
- an outer support sealing member mounted between the outer support connector and the drive wheel support of the track assembly frame to seal an interior of the drive wheel support.

15. The vehicle of claim 12, wherein:
the guard body has an inner lateral edge and an outer lateral edge, the inner lateral edge being laterally closer to a longitudinal centerplane of the vehicle than the outer lateral edge; and
the inner support member and the outer support member are disposed laterally between the inner and outer lateral edges of the guard body.

16. The vehicle of claim 9, wherein:
the rigid portion of the guard body defines a notch along a lateral side thereof; and
the flexible portion of the guard body extends at least partly within the notch defined by the rigid portion.

17. The vehicle of claim 9, wherein the guard body further extends over a portion of the endless track forward of the drive wheel.

18. The vehicle of claim 9, wherein at least one lateral end portion of the guard body wraps over a corresponding lateral edge of the endless track.

* * * * *

UNITED STATES PATENT AND TRADEMARK OFFICE
CERTIFICATE OF CORRECTION

PATENT NO. : 11,685,447 B2
APPLICATION NO. : 16/743036
DATED : June 27, 2023
INVENTOR(S) : Raphael Couture et al.

It is certified that error appears in the above-identified patent and that said Letters Patent is hereby corrected as shown below:

In the Claims

Claim 14, Column 16, Line 64, "an outer lateral end" should read --to an outer lateral end--

Signed and Sealed this
Second Day of January, 2024

Katherine Kelly Vidal
*Director of the United States Patent and Trademark Office*